US006562442B2

(12) United States Patent
Sogabe et al.

(10) Patent No.: US 6,562,442 B2
(45) Date of Patent: May 13, 2003

(54) METALLIC THERMAL TRANSFER RECORDING MEDIUM

(75) Inventors: Jun Sogabe, Osaka (JP); Yuuichi Miyakusa, Osaka (JP); Yoshiyuki Asabe, Tokyo-to (JP); Yasutoshi Inoue, Tokyo-to (JP)

(73) Assignees: Fijicopian Co., Ltd., Osaka (JP); Alps Electric Co., Ltd., Tokyo-To (JP)

( * ) Notice: Subject to any disclaimer, the term of this patent is extended or adjusted under 35 U.S.C. 154(b) by 76 days.

(21) Appl. No.: 09/761,607

(22) Filed: Jan. 16, 2001

(65) Prior Publication Data

US 2001/0003612 A1 Jun. 14, 2001

Related U.S. Application Data

(63) Continuation-in-part of application No. 09/377,380, filed on Aug. 19, 1999, now abandoned.

(30) Foreign Application Priority Data

Aug. 20, 1998 (JP) .......................................... 10-234274

(51) Int. Cl.[7] ................................................ B32B 3/00
(52) U.S. Cl. ....................................... 428/195; 428/220
(58) Field of Search ................................ 428/195, 913, 428/914, 343, 344, 352

(56) References Cited

U.S. PATENT DOCUMENTS 4,892,602 A 1/1990 Oike et al.
5,525,403 A 6/1996 Kawabata et al.
5,981,045 A 11/1999 Kuwabara et al.
6,080,479 A * 6/2000 Sogabe et al. .............. 428/344

FOREIGN PATENT DOCUMENTS

| | | | | |
|---|---|---|---|---|
| EP | 0 257 499 A2 | | 3/1988 | ............ B41M/5/26 |
| EP | 0 263 478 A2 | | 4/1988 | ............ B41M/5/26 |
| EP | 0 542 208 A1 | | 5/1993 | ............ B41M/5/38 |
| EP | 0 683 058 A1 | | 11/1995 | ............ B41M/5/38 |
| EP | 0 812 701 A1 | | 12/1997 | ............ B41M/5/38 |
| EP | 823333 | * | 2/1998 | ............ B41M/5/38 |
| JP | 4144790 A | | 5/1992 | ............ B41M/5/40 |
| JP | 4292991 A | | 10/1992 | ............ B41M/5/40 |
| JP | 10044631 A | | 2/1998 | ............ B41M/5/40 |
| JP | 2000006541 A | | 1/2000 | ............ B41M/5/40 |

* cited by examiner

*Primary Examiner*—Bruce H. Hess
*Assistant Examiner*—Michael E. Grendzynski
(74) *Attorney, Agent, or Firm*—Fish & Neave

(57) ABSTRACT

A thermal transfer recording medium for forming a printed image with metallic luster of high level with superior transferability according to a thermal transfer mechanism is disclosed which comprises a foundation, and provided on one side of the foundation, a laminate transfer layer comprising at least a release layer, a heat-resistant layer for metal deposition, a metal deposition layer and an adhesive layer in this order from the foundation side, the release layer having a thickness of 0.05 to 0.50 μm and a softening point not lower than 100° C., the release layer being a substantially transparent layer consisting essentially of a resin, and the peel strength of the laminate transfer layer from the foundation according to T-mode peeling being not larger than 50 gf/12.7 mm.

3 Claims, No Drawings

METALLIC THERMAL TRANSFER RECORDING MEDIUM

This application is a continuation-in-part of application Ser. No. 09/377,380 filed Aug. 19, 1999, abandoned.

BACKGROUND OF THE INVENTION

The present invention relates to a thermal transfer recording medium for use in word processors, facsimile terminal equipment, and the like. More particularly, the invention relates to a thermal transfer recording medium containing a metal deposition layer used for forming printed images with metallic luster utilizing a thermal transfer mechanism.

In general, metallic thermal transfer recording media conventionally used in forming printed images with metallic luster have a basic structure comprising a foundation and provided on one side of the foundation, a release layer, a heat resistant layer for metal deposition, a metal deposition layer and an adhesive layer in this order from the foundation side. The release layer is composed of a wax as a main component from the standpoint of the transfer performance when thermally transferring. The thickness of the release layer is usually in the range of 0.5 to 5 μm.

However, when the release layer composed of a wax as a main component is heated for thermal transfer, the heated portion of the release layer having a large thickness becomes a melt having a low viscosity between the foundation and the hear-resistant layer for metal deposition, so that a portion wherein the mechanical strength is very small is formed between the foundation and the heat-resistant layer supporting the metal deposition layer. The heat-resistant layer for metal deposition cannot have so great a strength to ensure a transfer sensitivity. Consequently, the heat-resistant layer at that portion cannot withstand the pressure applied when transferring and the metal deposition layer is collapsed, resulting in printed images with poor metallic luster.

In view of the foregoing, it is an object of the present invention to provide a metallic thermal transfer recording medium which has superior transferability and is capable of forming a printed image with metallic luster of high level according to a thermal transfer mechanism.

This and other objects of the present invention will become apparent from the description hereinafter.

SUMMARY OF THE INVENTION

The present invention provides a thermal transfer recording medium for forming a printed image with metallic luster, comprising a foundation, and provided on one side of the foundation, a laminate transfer layer comprising at least a release layer, a heat-resistant layer for metal deposition, a metal deposition layer and an adhesive layer in this order from the foundation side, the release layer having a thickness of 0.05 to 0.50 μm and a softening point not lower than 100° C., the release layer being a substantially transparent layer consisting essentially of a resin, and the peel strength of the laminate transfer layer from the foundation according to T-mode peeling being not larger than 50 gf/12.7 mm.

According to an embodiment of the present invention, the resin of the release layer comprises an amorphous polymer having a glass transition point of not lower than 70° C. and a weight average molecular weight of 500 to 2,000.

According to another embodiment of the present invention, the amorphous resin is at least one resin selected from the group consisting of a petroleum resin, a rosin resin and a terpene resin.

DETAILED DESCRIPTION

In the present invention, the peel strength between the foundation and the laminate transfer layer comprising at least a release layer, a heat-resistant layer for metal deposition, a metal deposition layer and an adhesive layer formed on the foundation in this order is a value measured by means of a tensile tester (HEIDON-14 made by Sinto Kagaku Kabushiki Kaisha) according to T-mode peeling (90 degree peeling) at a peeling speed of 250 mm/second in an atmosphere of 25° C. and 60% RH with respect to a test piece having width of 12.7 mm. As an adhesive tape, those showing a strong adhesion to the adhesive layer of the thermal transfer recording medium (e.g. Cellotape No. 405 made by Nichiban Company, Limited) are used.

The thermal transfer recording medium of the present invention has a basic structure comprising a foundation, and provided on one side of the foundation, a laminate transfer layer comprising a release layer, a heat-resistant layer for metal deposition, a metal deposition layer and an adhesive layer in this order from the foundation side.

The present invention is characterized by using as the release layer a layer having a thickness of 0.05 to 0.50 μm and a softening point not lower than 100° C. By using such a release layer, the strength supporting the heat-resistant layer, which in turn supports the metal deposition layer, at the portion heated when transferring can be ensured, resulting in printed images with metallic luster of high level. Further, by adjusting the peel strength of the laminate transfer layer from the foundation according to T-mode peeling to a value not larger than 50 gf/12.7 mm, the transferability is not degraded even when the release layer is composed of a resin.

The present invention will be explained in detail.

The foundation useful in the present invention is a polyethylene terephthalate film having a thickness of 2 to 6 μm from the standpoint of durability, heat conduction and cost. A polyethylene terephthalate film having a thickness of 4 to 6 μm is particularly preferable from the standpoint of the mechanical strength required when transferring. It is preferable to provide a sticking preventive layer on the backside of the foundation in order to prevent the foundation from sticking to a recording head.

The release layer which is an important feature of the present invention has a softening point not lower than 100° C. and is substantially composed of a resin only to ensure the aforesaid effect of supporting the metal deposition layer during thermal transfer. From this standpoint, the resin used in the release layer is preferably selected from thermoplastic resins which have a softening point not lower than 100° C. and show a small adhesive strength to the foundation. More preferable thermoplastic resins are amorphous polymers having a glass transition point of not lower than 70° C. and a weight average molecular weight of 500 to 2,000. Herein, the term "amorphous polymer" refers to a polymer showing no clear endothermic peak in its DSC curve. Preferable amorphous polymers are at least one member selected from the group consisting of a petroleum resin, a rosin resin and a terpene resin. The content of the amorphous polymer in the release layer is preferably not less than 60% by weight, more preferably not less than 80% by weight. When the softening point of the release layer is excessively high, the transferability is degraded. Therefore, the softening point of the release layer is preferably not higher than 180° C.

As required, a thermoplastic resin other than the above-mentioned may be added to the release layer to improve the handling property of the recording medium as an ink ribbon (e.g. prevention of flaking of the transfer layer) by increasing the adhesive strength of the release layer to the foundation. Examples of such other thermoplastic resins include olefin resins such as ethylene-vinyl acetate copolymers, polyamide resins, polyester resins, and natural rubber. These resins may be used either alone or in combination.

The release layer is required to be a thin film so that the action of supporting the metal deposition layer by the foundation through the release layer is not degraded. When this and transferability are taken in consideration, the thickness of the release layer is preferably from 0.05 to 0.5 μm.

The release layer is required to be substantially transparent to provide printed images with metallic luster of high level. Herein, that a release layer is substantially transparent means as follows: A coating composition used for forming the release layer is applied in a coating thickness of 1.0 μm after being dried onto a polyethylene terephthalate (PET) film having a thickness of 4.5 μm and the visible light transmittance of the thus obtained coated PET film is measured. When the visible light transmittance of the coated PET film is not less than 70%, it is judged that the release layer is substantially transparent.

The heat-resistant layer for metal deposition in the present invention functions as a layer which has the heat resistance required for metal deposition and supports the formed metal deposition layer. The heat-resistant layer is composed of a thermoplastic resin (inclusive of elastomer) as a main component. Examples of the thermoplastic resins include polyester resins, polyamide resins, polyurethane resins, (meth) acrylic resins and ionomer resins. These resins may be used either alone or in combination. The heat-resistant layer preferably has a softening point not lower than 100° C. from the standpoint of the heat resistance required for metal deposition.

The thickness of the heat-resistant layer for metal deposition is preferably in the range of 0.2 to 1.0 μm from the standpoint of thermal transferability. When the thickness of the heat-resistant layer is less than 0.2 μm, the desired mechanical strength cannot be ensured so that the metal deposition layer is prone to be collapsed when transferring. When the thickness of the heat-resistant layer is more than 1.0 μm, no printed images with high-definition are prone to be obtained.

The heat-resistant layer is required to be substantially transparent to provide printed images with metallic luster of high level. Herein, that a heat-resistant layer is substantially transparent means as follows: A coating composition used for forming the heat-resistant layer is applied in a coating thickness of 1.0 μm after being dried onto a polyethylene terephthalate (PET) film having a thickness of 4.5 μm and the visible light transmittance of the thus obtained coated PET film is measured. When the visible light transmittance of the coated PET film is not less than 70%, it is judged that the heat-resistant layer is substantially transparent.

Printed images with a metallic luster in a variety of colors can be obtained by coloring the heat-resistant layer. As the coloring agent for coloring, a dye is preferably used to ensure the transparency of the heat-resistant layer. However, a pigment which is highly dispersed can also be used.

Examples of metals for the metal deposition layer are aluminum, zinc, tin, silver, gold, platinum, and the like. Usually aluminum is preferred. The metal deposition layer can be formed by a physical deposition method such as vacuum deposition, sputtering or iron plating, or chemical deposition method. From the viewpoint of ensuring metallic luster of high level, the thickness of the metal deposition layer is preferably in the range of 10 to 100 nm, especially 20 to 40 nm.

The adhesive layer is composed of an adhesive resin as a main component. Examples of the adhesive resins are polyester resins, polyamide resins, polyurethane resins, ethylene-vinyl acetate copolymers, rosin resins, terpene resins and phenol resins. These adhesive resins may be used either alone or in combination. The adhesive layer preferably has a softening point of 50° to 120° C. to obtain superior transferability. The adhesive layer may be incorporated with a small amount of a particulate material or a lubricating material to prevent blocking or smudging. The thickness of the adhesive layer is preferably from 0.5 to 2.0 μm.

The present invention will be described in more detail by way of the Examples. It is to be understood that the present invention will not be limited to the Examples, and various changes and modifications may be made in the invention without departing from the spirit and scope thereof.

EXAMPLE 1

A 4.5 μm-thick polyethylene terephthalate film having a 0.2 μm-thick sticking-preventive layer composed of a silicone resin on one side thereof was used as a foundation. The below-mentioned layers were successively formed on the opposite side of the foundation with respect to the sticking-preventive layer.

Coating liquid for release layer

| Component | Parts by weight |
|---|---|
| Petroleum resin (softening point 125° C., glass transition point 85° C., weight average molecular weight 900) | 9 |
| Ethylene-vinyl acetate copolymer (softening point 60° C.) | 1 |
| Toluene | 90 |
| Total | 100 |

The above coating liquid was applied onto the foundation and dried to form a 0.2 μm-thick release layer having a softening point of 121° C.

Coating liquid for heat-resistant layer

| Component | Parts by weight |
|---|---|
| Acrylic resin (softening point 120° C.) | 8 |
| Valifast Yellow 4120 (yellow dye made by Orient Kagaku Kabushiki Kaisha) | 2 |
| Methyl ethyl ketone | 90 |
| Total | 100 |

The above coating liquid was applied onto the release layer and dried to form a 0.7 μm-thick heat-resistant layer for metal deposition.

Aluminum was deposited onto the heat-resistant layer for metal deposition by a vacuum deposition method to form an aluminum deposition layer having a thickness of 20 nm.

| Coating liquid for adhesive layer | |
|---|---|
| Component | Parts by weight |
| Phenol resin (softening point 90° C.) | 9.5 |
| Silica (average particle size 1.0 $\mu$m) | 0.5 |
| Isopropyl alcohol | 90 |
| Total | 100 |

The above coating liquid was applied onto the aluminum deposition layer and dried to form a 0.5 $\mu$m-thick adhesive layer.

With respect to the thus obtained metallic thermal transfer recording medium, the peel strength of the laminate transfer layer from the foundation according to T-mode peeling was 19 gf/12.7 mm. Using the metallic thermal transfer recording medium, printing was performed under the below-mentioned printing conditions to form printed images. The transferability was evaluated and the gloss of the printed image was measured.

Printing Conditions

Thermal transfer printer: MD 1300 made by Alps Electric Co., Ltd.

Printing mode: photo-color mode (a yellow ribbon cassette for photo-color in which the obtained metallic thermal transfer recording medium was loaded was used.)

Image pattern: a modified checkered flag pattern composed of yellow solid-printed parts and unprinted parts, the area of the yellow solid-printed parts being 20% of the entire area of the pattern Printing paper: white present card specialized for the above printer (made by Alps Electric Co., Ltd.)

Transferability

The transferability was evaluated by observing whether a solid-printed image containing no voids was obtained or not.

Gloss

The gloss of the solid-printed image was measured by means of a glossmeter (digital glossmeter GM-260 made by Kabushiki Kaisha Murakami Shikisai Gijutsu Kenkyusho).

Results

The metallic thermal transfer recording medium exhibited superior transferability to provide solid-printed images containing no voids and having high metallic luster with a gloss of 500.

The metallic thermal transfer recording medium of the present invention exhibits superior transferability and provides printed image with metallic luster of high level according to the thermal transfer mechanism.

What we claim is:

1. A thermal transfer recording medium for forming a printed image with metallic luster, comprising a foundation, and provided on one side of the foundation, a laminate transfer layer comprising at least a release layer, a heat-resistant layer for metal deposition, a metal deposition layer and an adhesive layer in this order from the foundation side, the release layer having a thickness of 0.05 to 0.50 $\mu$m and a softening point not lower than 100° C., the release layer being a substantially transparent layer consisting essentially of a resin, and the peel strength of the laminate transfer layer from the foundation according to T-mode peeling being not larger than 50 gf/12.7 mm.

2. The thermal transfer recording medium of claim 1, wherein the resin of the release layer comprises an amorphous polymer having a glass transition point of not lower than 70° C. and a weight average molecular weight of 500 to 2,000.

3. The thermal transfer recording medium of claim 2, wherein the amorphous polymer is at least one polymer selected from the group consisting of a petroleum resin, a rosin resin and a terpene resin.

* * * * *